R. E. L. JANNEY.
DRAFT CONNECTION FOR CAR COUPLINGS.
APPLICATION FILED NOV. 18, 1919.
1,365,498.
Patented Jan. 11, 1921.
4 SHEETS—SHEET 1.
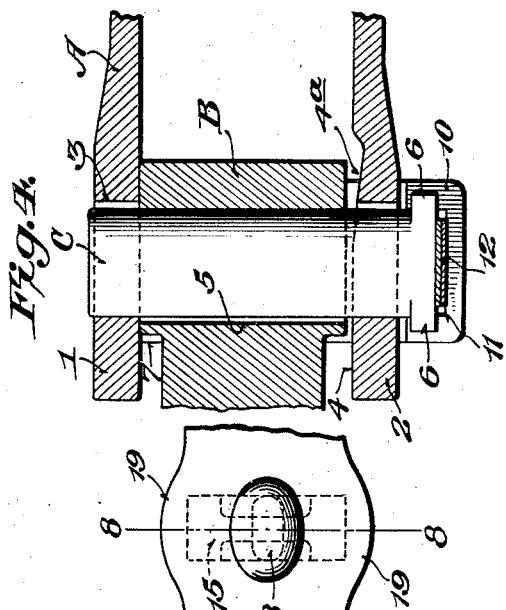
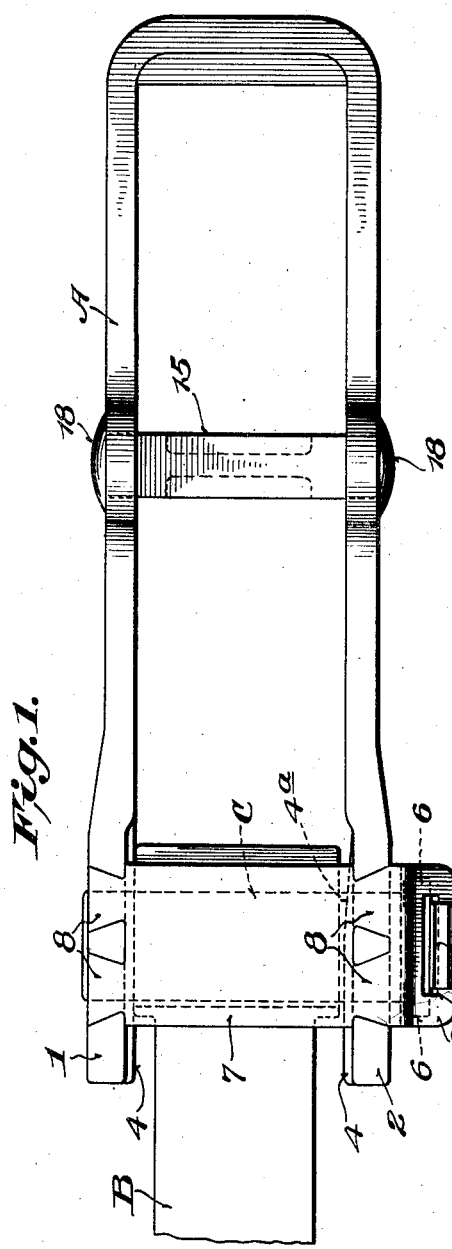
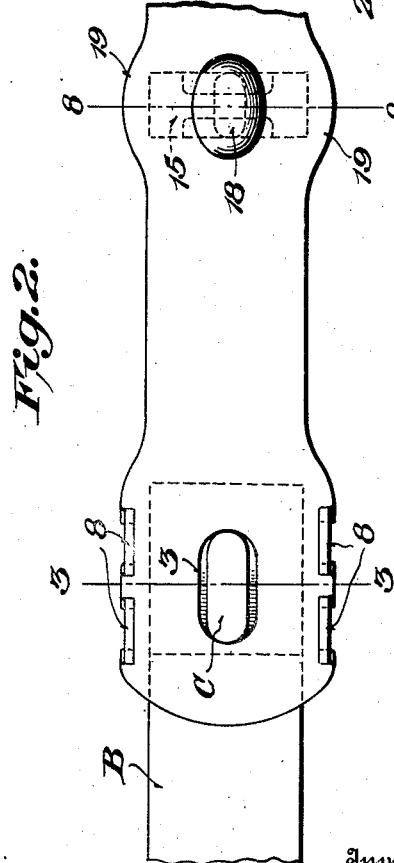
Witness
Chas. L. Giesbauer
Inventor
R. E. L. Janney,
By Hubard & Hubard
his Attorneys

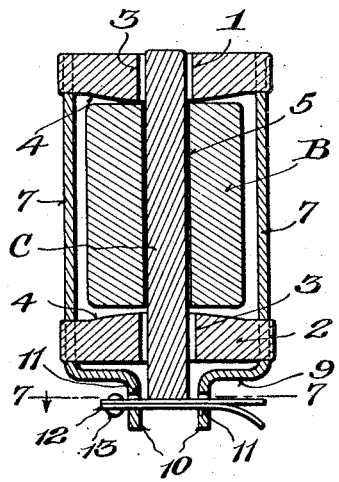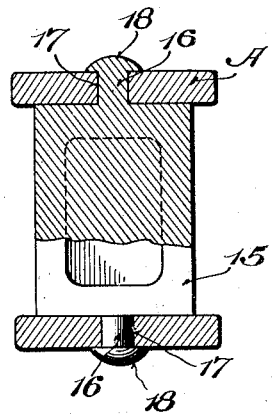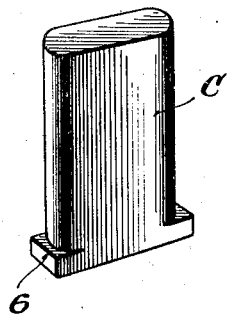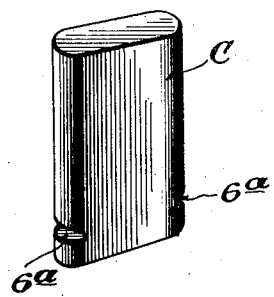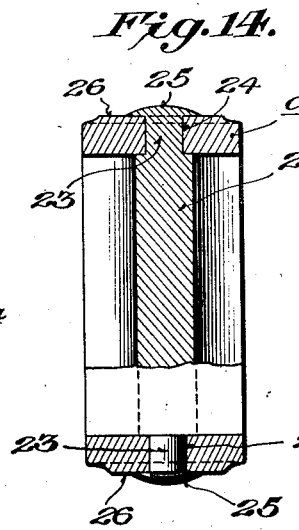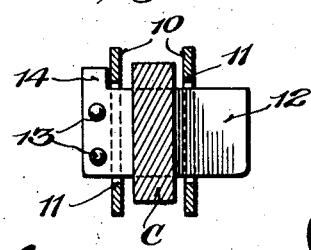

R. E. L. JANNEY.
DRAFT CONNECTION FOR CAR COUPLINGS.
APPLICATION FILED NOV. 18, 1919.
1,365,498.
Patented Jan. 11, 1921.
4 SHEETS—SHEET 3.
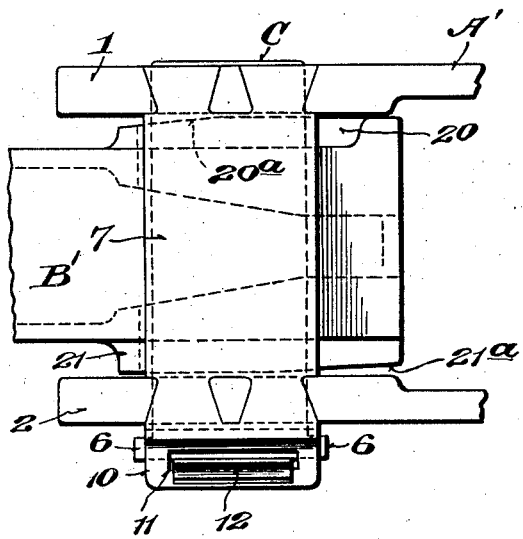
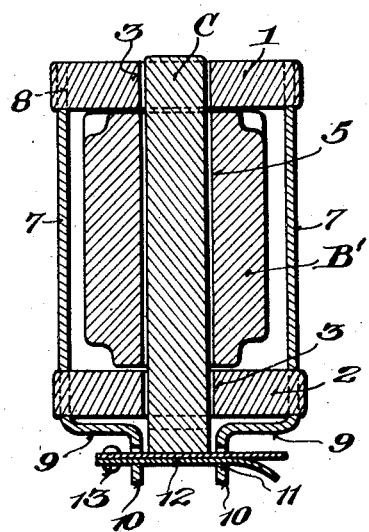
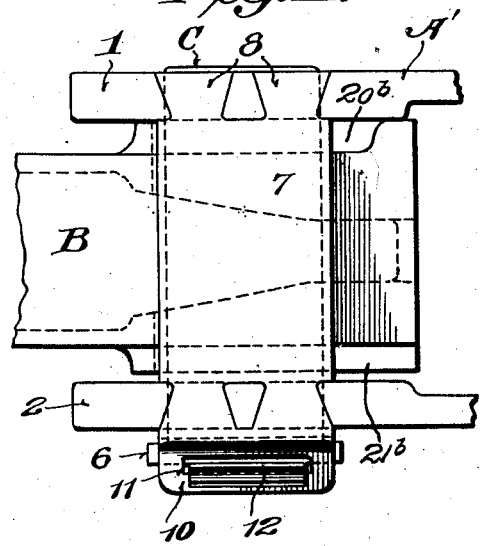
Witness
Chas. L. Griesbauer
Inventor
R. E. L. Janney,
By Shepard & Shepard
His Attorneys

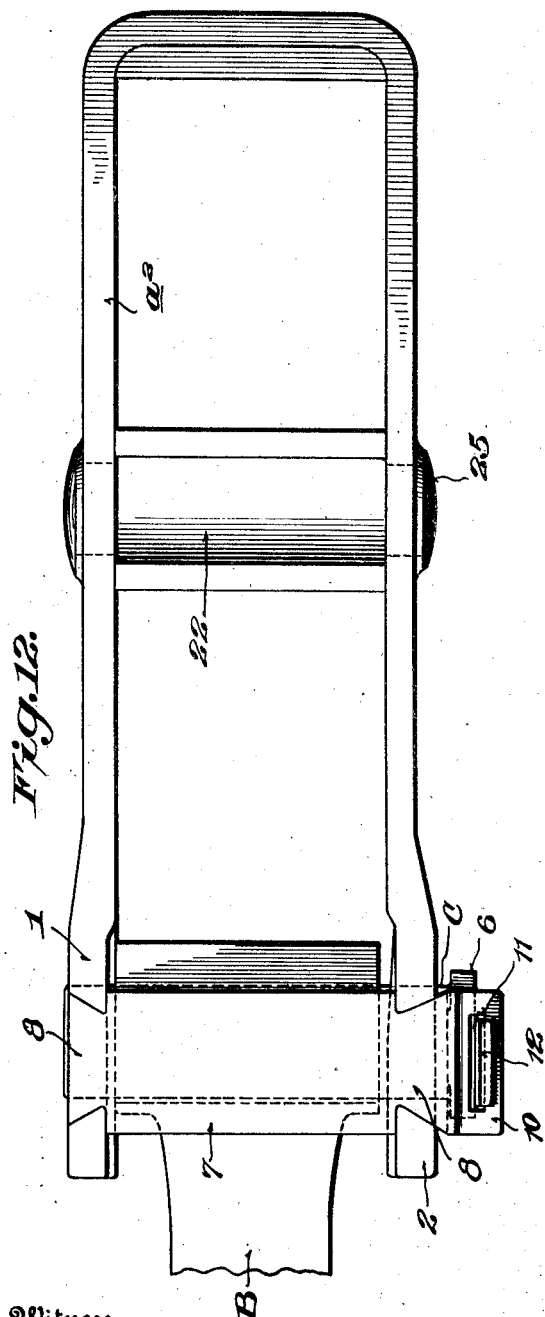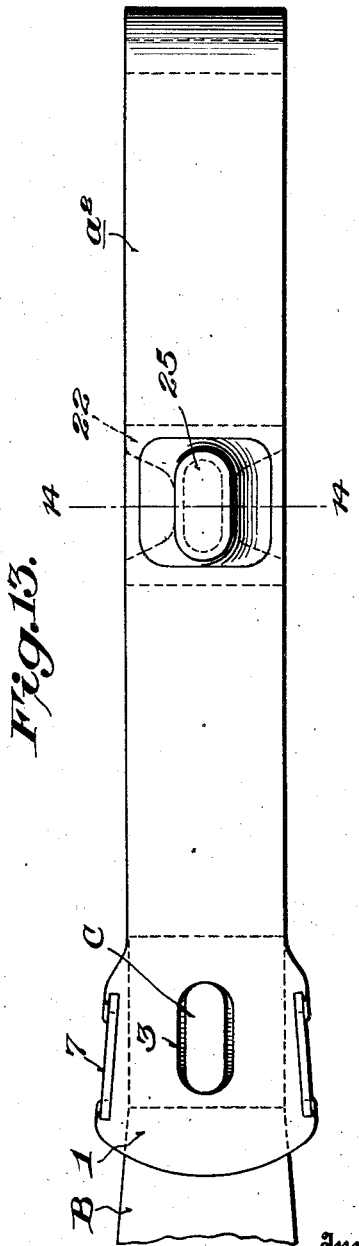

UNITED STATES PATENT OFFICE.

ROBERT E. L. JANNEY, OF CHICAGO, ILLINOIS.

DRAFT CONNECTION FOR CAR-COUPLINGS.

1,365,498. Specification of Letters Patent. Patented Jan. 11, 1921.

Application filed November 18, 1919. Serial No. 338,948.

*To all whom it may concern:*

Be it known that I, ROBERT E. L. JANNEY, a citizen of the United States, residing at Chicago, in the county of Cook and State of Illinois, have invented new and useful Improvements in Draft Connections for Car-Couplings, of which the following is a specification.

This invention relates to draft connections for car couplers, *i. e.* the connection between the shank of a car coupler and a draft rigging yoke, and in particular to the key type of connection wherein the key extends vertically through the arms of the yoke and the butt of the shank.

It is an important object of the present invention to provide for vertical and horizontal angling of the coupler shank and also turning or rotating of the shank about its longitudinal axis independently of the yoke without imparting undue strains to the yoke and draft rigging and to obtain these important advantages in a standard M. C. B. coupler shank without change in the shank design.

Further objects of the invention are to facilitate the introduction and removal of the draft key, and to provide for supporting the key in its operative position in a very simple and efficient manner; to provide for tying together the arms of the yoke so as to prevent spreading thereof under pulling stresses; and also to equip the yoke with an improved form of strut abutment for use with tandem draft springs.

With these and other objects in view, the present invention consists in the combination and arrangement of parts as will be hereinafter more fully described, illustrated in the accompanying drawings, and particularly pointed out in the appended claims, it of course being understood that changes in the form, proportion, size and minor details may be made, within the scope of the claims, without departing from the spirit or sacrificing any of the advantages of the invention.

In the drawings,

Figure 1 is a side elevation of a tandem draft yoke and a portion of a coupler shank embodying features of the present invention.

Fig. 2 is a top plan view thereof.

Fig. 3 is a cross sectional view on the line 3—3 of Fig. 2.

Fig. 4 is a detail sectional view taken vertically and longitudinally through the connection between the yoke and coupler shank as employed with the single type draft rigging.

Fig. 5 is a detail perspective view of the draft key of the present invention.

Fig. 6 is a view similar to Fig. 5 showing notches in lieu of a head.

Fig. 7 is a plan section on the line 7—7 of Fig. 3.

Fig. 8 is a cross sectional view on the line 8—8 of Fig. 2.

Fig. 9 is a fragmentary side elevation illustrating the features of the invention as shown in Fig. 1 applied to the form of coupler shank shown in my copending application filed March 11, 1919, Serial No. 282,025.

Fig. 10 is a cross sectional view of Fig. 9.

Fig. 11 is a view similar to Fig. 9 but showing another manner of providing for vertical angling of the coupler shank and twisting or turning thereof on its longitudinal axis.

Fig. 12 is a view similar to Fig. 1 showing modifications.

Fig. 13 is a top plan view of Fig. 12.

Fig. 14 is a cross sectional view on the line 14—14 of Fig. 13.

Referring at first more particularly to Figs. 1 to 6 inclusive, A designates a draft yoke, B designates the shank and liner blocks of an M. C. B. standard car coupler and C designates a draft key.

The improvements of the present invention, as shown in Figs. 1 to 6 inclusive, reside in the yoke and draft key, and said improvements adapt the yoke and key for use with a standard M. C. B. coupler shank without change in the design thereof.

Wherever the term draft key is employed in the present specification and claims, I mean a draft key of the M. C. B. type and which is substantially oblong in cross-section with the major axis of said cross-section disposed longitudinally of the coupler shank, as distinguished from rivets and pivot pins of circular cross-section.

The yoke may be made from a metal strap having the original thickness of the front ends 1 and 2 of the arms of the yoke, said strap being drawn and bent to the shape shown in Fig. 1, the intermediate portion of the strap between the end portions 1 and 2 being reduced in thickness, and the inner faces of the terminals 1 and 2 lying in substantially the same planes with the inner faces of the respective arms of the yoke, whereby pulling and draft stresses are transmitted in straight lines from the terminals or end portions 1 and 2 to the major portions of the arms of the yoke. So far as some features of the present invention are concerned, instead of drawing a strap to shape, the ends of the strap may be upset to obtain the desired thickness. For some of the purposes of the invention the yoke may be a casting, as will hereinafter appear. Each arm of the yoke is provided with a longitudinal slot 3 constituting the keyway for the reception of the draft key C. In producing these keyways, the metal is not removed but is displaced and forced into the ends or terminals of the yoke arms, thereby to avoid the loss of metal. In other words the cross-section of the front end of each arm through the keyway is at least equal to the cross-section of the arm.

In the vertically keyed or riveted form of connection between a standard M. C. B. coupler shank and yoke, it is the usual practice to have the front ends of the arms of the yoke separated by a space substantially equal to the vertical depth of the liner block butt end portion of the shank so as to bring the draft in line with the yoke arms, and therefore, in the present invention, I have resorted to means for obtaining flexibility in the connection somewhat different from that shown in my prior application where a specially designed shank is shown.

The inner face of the end or terminal of each arm is rounded or convexed transversely as shown at 4 in Fig. 3 of the drawings. As best indicated in Fig. 1 of the drawings it will be seen that the crown of the convexed portion 4 of the upper arms lies in the same straight line with the corresponding portion of the inner face of the top arm of the yoke. The crown of the convexed inner face of the lower yoke end 2 has its inner portion inclined downwardly and inwardly as at 4$^a$, for a purpose as will hereinafter appear.

An ordinary liner block type of coupler shank has been shown in Figs. 1 to 4 inclusive, and this shank is provided with an upright keyway 5 which is brought into alinement with the keyways 3 in the arms of the yoke so as to receive the draft key C which is introduced upwardly through the keyway in the bottom of the yoke. According to one embodiment of the present invention the lower end of the draft key is provided with ears or projections 6 at the front and rear of the key so as to provide a head to limit upward movement of the key, and also to provide seats or abutments for convenience in prying or pulling the key downwardly from the shank and yoke whenever it is necessary to forcibly remove the key from the yoke. In lieu of the head or projection 6, the draft key C may be provided with notches or recesses 6$^a$, as shown in Fig. 6 of the drawings. While these notches will not serve to limit the upward movement of the key, they will serve for receiving the end of an instrument for pulling or prying the draft key downwardly whenever force is necessary to remove the key.

As best indicated in Fig. 4 of the drawings, which shows the draft connection for a single draft rigging as distinguished from a tandem rigging as shown in Figs. 1 and 2, it will be seen that the length of the keyway 5 in the coupler shank is greater than the greatest width of the draft key C, and said draft key normally lies against the rear wall of the keyway 5 so as to leave a space between the front walls of the key and the keyway through the shank. The keyways 3 in the yoke are longer than the greatest width of the draft key C, and the draft key normally lies against the front walls of the keyways 3 so as to provide a space between the rear wall of the key and the rear wall of each keyway 3. This spacing of the key with respect to the front and rear walls of the keyways through the shank and through the arms of the yoke is for the purpose of permitting vertical angling of the shank upon the draft key without imparting strains to the yoke. It will now be understood that the inclined portion 4$^a$ of the inner face of the lower arm of the yoke accommodates the lower rear extremity of the coupler shank during upward tilting of the front end of the shank from its normal horizontal position. The top of the butt end of the shank is normally in contact with the lower face of the upper arm of the yoke, because, in accordance with present practice, the intermediate portion of the shank is supported upon a carry iron, not shown in the drawings, and the head of the coupler overbalances the butt end of the shank and thereby brings the latter in contact with the upper arm of the yoke.

In the tandem form of rigging, shown in Figs. 1 and 2, 12 and 13, I have shown no spaces between the back of the draft key C and the back walls of the keyways in the yoke arms, as it is necessary for the coupler shank and yoke to simultaneously move rearwardly under buffing impacts.

As best indicated in Fig. 3 of the drawing it will be seen that the draft key C has a minor width just sufficient to permit introduction and removal of the key through the keyway in the shank, whereby the shank and key are substantially rigidly connected with respect to horizontal angling movements of the shank, and therefore the key turns or angles horizontally with the shank. To permit this turning or angling movement of the draft key, the keyways 3 in the arms of the yoke have a width transversely somewhat greater than that of the minor width of the draft key, as shown in Figs. 2 and 3 of the drawings.

The shank may turn or rotate on its longitudinal axis. This turning or twisting movement of the shank is permitted by reason of the fact that the keyways 3 in the yoke are wider than the draft key C, and, as shown in Fig. 3, the inner faces of the arms of the yoke are convexed at 4 so as not to interfere with a limited turning or rocking of the shank.

To prevent spreading of the front ends of the yoke under pulling stresses, said ends are tied together by duplicate tie plates 7 disposed at opposite sides of the yoke. Each tie plate is rigidly and permanently connected to the upright edge of each arm of the yoke in transverse alinement with the keyways therethrough, and preferably has portions let into the upright edges of the yoke so as to form a mortise and tenon connection therewith. A dove-tail joint 8 is shown in Fig. 1 of the drawings for each end of the tie plate. A satisfactory manner of making the connection is to provide mortises in the yoke arms, then heat the yoke arms until the mortises expand sufficiently to receive the tenon portions of the tie plate, after which the metal of the arms is upset across the outer face of the tenon portions, and when the yoke cools it will shrink to a strong and rigid fit around the tenon portions of the tie plate.

By reference to Fig. 3 of the drawings, it will be seen that each tie plate 7 extends below the lower yoke arm and has an inwardly directed portion 9 and a depending part 10 provided with an opening 11 located below the bottom of the draft key. The openings 11 of the parts 10 are in alinement as shown in Fig. 3 and receive a split cotter 12 shown in detail in Fig. 7 of the drawings. This cotter may be made up of a pair of plates secured together at one end as by rivets 13, the plates at the other end of the cotter being unconnected and capable of being spread, as shown in Fig. 3 of the drawings, so as to prevent endwise displacement of the cotter in one direction. The riveted end of the cotter, as shown in Fig. 7, is provided with a lateral projection or head 14 to engage the adjacent side of the part 10 and prevent endwise displacement or movement of the cotter in one direction. Inasmuch as the cotter underlies the bottom of the draft key C, the latter will be held in its normal operative position and may be removed downwardly after the cotter 12 has been removed. It will now be understood that the headed bottom end of the draft key normally rests upon the cotter, the head or projections 6 of the key being disposed slightly below the bottom of the yoke, whereby any suitable instrument may be introduced between the head or projection 6 and the bottom of the yoke for pulling or prying the draft key downwardly should it stick in the keyways.

To accommodate the yoke to a tandem draft rigging, an abutment 15 is provided. This abutment is in the form of a strut fitting snugly between the inner faces of the arms of the yoke and provided at its top and bottom, as shown in Fig. 8, with studs or projections 16 extending through suitable openings 17 in the arms of the yoke, each of said studs or projections having its outer end upset as at 18 so as to form a head lying against the outer face of the arm of the yoke. By this construction, the strut or abutment is rigidly held in place and can be drawn tight against the yoke arms when upsetting the ends of the studs or projections. In Figs. 1 and 2 of the drawings, it will be noted that each arm of the yoke is widened at each side of the opening 17, as indicated at 19, the metal constituting these ears being that which is forced aside in forming the opening 17 through the arm of the yoke, whereby the cross sectional area of the arm is preserved and the strength of the arm is not materially reduced.

The tie plate and draft key supporting features of the present invention are applicable to the form of draft connection shown in my copending application filed March 11, 1919, Serial No. 282,025, as will be understood by reference to Figs. 9 and 10 of the present drawings. In said figures of the drawings the tie plates and draft key supporting means are identical with those shown and described in Figs. 1 to 4, inclusive, the only differences residing in the yoke and the coupler shank. The yoke A has the thickened front ends 1 and 2 which project at the inner faces of the respective arms of the yoke. The shank B' is provided with a vertical keyway 5, and the arms of the yoke are provided with alined keyways 3. The draft key C is received through the keyways of the yoke and the shank. There is a space between the front of the key C and the front wall of the keyway through the shank on the draft key. There are no spaces between the back walls of the keyways through the draft arms and the ends of the draft key C. The top and bottom faces of the shank are substantially straight from the coupler head to the butt end of the shank. An upstanding boss 20 surrounds the top of the keyway 5 in the shank, and a similar boss 21 surrounds the lower end of the keyway 5. The top face of the upper boss 20 has a front portion 20ª which inclines upwardly and rearwardly, and the lower face of the lower boss 21 has an upwardly and rearwardly inclined portion 21ª, as and for the purpose described in my prior application. The front portion of the lower boss 21 and the rear portion of the upper boss 20 lie in close proximity to the inner faces of the arms of the yoke, and vertical angling of the coupler shank is permitted by the inclined portions 20ª and 21ª of the bosses. As best shown in Fig. 10 of the drawings, it will be seen that the inner faces of the arms of the yoke are straight transversely instead of convexed as shown in Fig. 3.

In the arrangement shown in Fig. 11 of the drawings, it will be seen that the top face of the boss 20ᵇ and the bottom face of the boss 21ᵇ are substantially parallel throughout their lengths. The top boss is normally in engagement with the underside of the upper arm of the yoke, and the lower boss is spaced from the inner face of the lower arm of the yoke. This relation of parts is brought about by the fact that, in accordance with common practice, the coupler shank is supported at an intermediate portion upon a carry iron, not shown, and the weight of the coupler head overbalances the butt end of the shank and elevates the same into the position shown in Fig. 11. It will be understood that the coupler shank may angle vertically and horizontally and also turn or twist upon its horizontal axis in the manner described in my prior application.

In some forms of underframes there is not sufficient horizontal transverse space between the cheek-plates to accommodate a yoke of the type shown in Figs. 1 and 2, where the parts 19 project laterally from the yoke, and therefore I have provided the form of yoke shown in Figs. 12, 13 and 14. In this form, the yoke A² is similar to the yoke A, but differs therefrom in the configuration of the forward end portion of each arm of the yoke, and also in the manner of disposing of the metal which is displaced in forming the openings for the rivets at the top and bottom of the strut or abutment. As best shown in Fig. 13, it will be seen that the opposite edges of the forward ends of each arm of the yoke converge rearwardly, so as to conform to the inclination of the cheek-plates, but otherwise the said end is the same as that shown in Figs. 1 to 4, inclusive, and of course the tie plates 7 and the draft key C are identical with those hereinbefore described. The tie plates of course conform to the inclination of the side edges of the ends of the yoke arms. Only one tenon 8 is shown at each end of each tie plate, but it will of course be understood that two or more tenons may be employed.

While the strut or abutment 22, shown in Figs. 12, 13 and 14, may be of the shape shown at 15 in Figs. 1, 2 and 8, the I-shaped form shown in Fig. 13 is preferred. The strut or abutment 22 is provided at its top and bottom with studs or projections 23 extending through openings 24 in the top and bottom arms of the yoke, and the extremities of the studs or projections are upset as at 25, so as to draw the yoke arms into snug engagement with the ends of the strut. Instead of displacing the metal at the edges of the yoke arms, as shown in Fig. 2 of the drawings, the metal is displaced upon the top and bottom sides, respectively, of the yoke arms, as indicated at 26, whereby the yoke is not increased in width.

When applying the present flexible connection features to a single type of draft rigging, as shown in Fig. 4, there may be spaces between the back wall of the draft key and the back walls of the keyways in the yoke arms, as well as a space between the front walls of the draft key and the keyway through the coupler shank. When the flexible features are applied to a tandem draft rigging, as in Figs. 1, 2, 12 and 13, I may omit the spaces between the back wall of the draft key C and the back walls of the keyways through the arms of the yoke in order to reduce as far as possible the longitudinal movement of the coupler shank independent of the yoke.

While in my former application Serial No. 285,025 horizontal angling was obtained by making the keyway in the coupler shank of greater width than the thickness of the key, as clearly shown in Fig. 10, according to the present invention, the keyways of the yoke are of greater width than the key, as clearly indicated in Figs. 2 and 3 of the drawings.

It will be noted that the effect of the tie plates 7 is to provide a box-head or hooded type of yoke, but it will also be noted that the draft key extends through the arms of the yoke, so as to obtain the maximum pulling strength, rather than through the tie plates or vertical sides of the hood or box-head.

By employing a draft key support member independent of and underlying the bottom of the draft key, the latter is not weakened by the formation of an opening therethrough for the reception of a supporting member and the cutting of such an opening is obviated. Moreover the supporting member is independent of the draft key and therefore no stresses are transmitted thereto during angling or other movements of the shank on the key.

What I claim is:

1. A draft yoke of substantially U-shape having the terminals of its arms convexed transversely on their inner faces.

2. A draft yoke of substantially U-shape having the terminals of its arms convexed transversely on their inner faces, and the crown of each convexed portion being in substantial alinement with the inner face of the adjacent arm.

3. A forged draft yoke consisting of a substantially U-shaped strap, the terminals of the yoke arms being of substantially the original thickness of the strap, the remaining portion of the yoke being of a less thickness, the terminals of the yoke arms extending transversely beyond the outer faces of the respective yoke arms, each of said terminals being convexed transversely on its inner face, and the crown of each convexed portion being in substantial alinement with the inner face of the adjacent arm.

4. A draft yoke of substantially U-form having draft key-ways, the inner faces of the front terminals of the yoke arms being substantially flush with the inner faces of the yoke arms, and the inner face of the front terminal of one of the yoke arms in rear of the key-ways being inclined longitudinally of the yoke.

5. A draft yoke of substantially U-form having the inner face of each of the front terminals of its arms convexed transversely, and one of said convexed faces having a portion inclined longitudinally of the yoke.

6. A forged draft yoke of substantially U-shape having draft keyways in the arms thereof and provided with tie plates connecting the front end portions of the yoke arms at opposite sides thereof, each tie plate having a mortise and tenon connection with each arm of the yoke.

7. A forged draft yoke provided with alined keyways in its arms, tie plates rigidly secured to and connecting the yoke arms and provided with portions depending below the yoke, and a removable draft key supporting member carried by the depending portions of the tie plates.

8. A forged draft yoke provided with alined keyways in its arms, tie plates rigidly secured to and connecting the yoke arms and provided with portions extending inwardly beneath the yoke and then downwardly at opposite sides of the lower keyway, said downwardly extending portions having alined openings, and a removable draft key supporting member extending through said alined openings.

9. The combination of a draft yoke, a coupler shank therein, the arms of the yoke and the shank having vertically alined keyways, and a draft key extending through the keyways, and there being spaces between the side walls of the ends of the draft key and the side walls of the keyways in the arms of the yoke, whereby the coupler shank may angle horizontally.

10. The combination of a draft yoke, a coupler shank therein, the arms of the yoke and the shank having vertically alined keyways, and a draft key extending through the keyways, and there being spaces between the side walls of the ends of the draft key and the side walls of the keyways in the arms of the yoke, whereby the coupler shank may turn or twist on its longitudinal axis, the opposing faces of the coupler shank and the arms of the yoke having a relative configuration to permit turning or twisting of the shank on its longitudinal axis.

11. The combination of a draft yoke, a coupler shank therein, the arms of the yoke and the shank having vertically alined keyways, and a draft key extending through the keyways, and there being spaces between the side walls of the ends of the draft key and the side walls of the keyways in the arms of the yoke, whereby the coupler shank may turn or twist on its longitudinal axis, the inner faces of the arms of the yoke being convexed transversely across the coupler shank.

12. The combination of a draft yoke, a coupler shank therein, the arms of the yoke and the shank having vertically alined keyways, and a draft key extending through the keyways, and the top face of the lower arm of the yoke having a downwardly and rearwardly inclined portion beneath the butt end of the shank and at the rear of the draft keyway to accommodate the latter during vertical angling.

13. A forged metal draft rigging yoke of substantially U-shape having the front end of each arm thicker than the remaining portion of the arm and projecting at the outer side of the yoke, the inner face of the forward end of each arm being in substantial alinement with the inner face of the remaining portion of the arm, the thickened ends of the arms being provided with vertically alined draft key openings, the metal displaced to form the keyways being in the thickened ends of the arms, and the cross section of the front end of each arm through the keyway being at least equal to the cross section of the arm.

14. The combination of a draft yoke, a coupler shank, and a vertical draft key of the M. C. B type extending through the yoke arms and the shank, the top of the shank bearing against the upper arm of the yoke, and the bottom of the shank being spaced above the lower arm of the yoke, there being a space between the draft key and one of the other elements of the connection to permit vertical angling of the shank.

15. The combination of a draft yoke, a coupler shank, and a vertical draft key of the M. C. B. type extending through the yoke arms and the shank, the top and bottom faces of the shank being substantially parallel with the inner face of the yoke arms, one face of the shank bearing against the adjacent arm of the yoke, and the opposite face of the shank being spaced from the other arm of the yoke, there being a space between the draft key and one of the other elements of the connection to permit vertical angling of the shank.

16. The combination of a draft yoke, a coupler shank therein, a vertical draft key of the M. C. B. type, the yoke and the shank having alined vertical keyways receiving the key which is insertible from below, the major diameter of the keyway in the shank being longer than the the major diameter of the draft key, the shank and the yoke arms being spaced to permit vertical angling of the shank on the draft key, and means underlying and independent of the draft key to prevent downward displacement of the key.

17. The combination of a draft yoke, a coupler shank therein, a vertical draft key of the M. C. B. type, the yoke and the shank having alined vertical keyways receiving the key which is insertible from below, the side walls of the keyways in the yoke being spaced from the side walls of the key to permit horizontal angling of the shank, and means underlying and independent of the draft key to prevent downward displacement of the key.

18. The combination of a draft yoke, a coupler shank therein, a vertical draft key of the M. C. B. type, the yoke arms and the shank having alined vertical keyways receiving the key which is insertible from below, the major diameter of the keyway in the shank being longer than the major diameter of the key and the shank and yoke being spaced to permit vertical angling of the shank, the side walls of the keyways in the yoke being spaced from the side walls of the key to permit horizontal angling of the shank, and means underlying and independent of the draft key to prevent downward displacement of the key.

19. The combination of a draft yoke, a coupler shank therein, a vertical draft key of the M. C. B. type, the yoke arms and shank having alined vertical keyways receiving the key which is insertible from below, the key being held against vertical angling in the keyways of the yoke, the major diameter of the keyway in the shank being longer than the major diameter of the key and the shank and yoke arms being spaced to permit vertical angling of the shank on the key, and means underlying and independent of the draft key to prevent downward displacement of the key.

20. The combination of a draft yoke, a coupler shank therein, a vertical draft key of the M. C. B. type, the yoke arms and the shank having alined vertical keyways receiving the key which is insertible from below, the key being held against vertical angling in the keyways of the yoke, the side walls of the keyways in the yoke being spaced to permit horizontal angling of the draft key, the major diameter of the keyway in the shank being longer than the major diameter of the key and the shank and yoke arms being spaced to permit vertical angling of the shank upon the key, the key being held against horizontal angling within the keyway of the shank, and means underlying and independent of the draft key to prevent downward displacement of the key.

ROBERT E. L. JANNEY.